(12) United States Patent
Sakamoto et al.

(10) Patent No.: US 10,840,543 B2
(45) Date of Patent: Nov. 17, 2020

(54) SYSTEM AND METHOD FOR THE FORMATION OF FACILE LITHIUM METAL ANODE INTERFACE WITH A SOLID STATE ELECTROLYTE

(71) Applicant: The Regents of The University of Michigan, Ann Arbor, MI (US)

(72) Inventors: Jeffrey Sakamoto, Ann Arbor, MI (US); Travis Thompson, Ann Arbor, MI (US); Nathan Taylor, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 122 days.

(21) Appl. No.: 15/943,302

(22) Filed: Apr. 2, 2018

(65) Prior Publication Data

US 2018/0301751 A1      Oct. 18, 2018

Related U.S. Application Data

(60) Provisional application No. 62/480,051, filed on Mar. 31, 2017.

(51) Int. Cl.
*H01M 10/056* (2010.01)
*H01M 10/0562* (2010.01)
(Continued)

(52) U.S. Cl.
CPC ......... *H01M 10/0562* (2013.01); *C04B 35/01* (2013.01); *H01M 10/056* (2013.01);
(Continued)

(58) Field of Classification Search
CPC .. H01M 10/056; H01M 10/0562; C04B 35/01
(Continued)

(56) References Cited

U.S. PATENT DOCUMENTS 5,961,672 A    10/1999  Skotheim et al.
8,093,489 B2   1/2012   Sager et al.
(Continued)

FOREIGN PATENT DOCUMENTS

WO    2016033453 A1    3/2016
WO    2016069749 A1    5/2016

OTHER PUBLICATIONS

Luntz, et al., Interfacial Challenges in Solid-State Li Ion Batteries, Journal of Physical Chemistry Letters, 2015, 6:4599-4604.
(Continued)

*Primary Examiner* — Amanda C. Walke
(74) *Attorney, Agent, or Firm* — Quarles & Brady LLP

(57) ABSTRACT

Disclosed are electrochemical devices, such as lithium battery electrodes, lithium ion conducting solid-state electrolytes, and solid-state lithium metal batteries including these electrodes and solid-state electrolytes. In one disclosed method, a solid state electrolyte material including a precursor layer having a first electronic conductivity is provided; and the precursor layer on the solid state electrolyte material is reduced to an interfacial layer having a second electronic conductivity greater than the first electronic conductivity. Also disclosed is a method of forming a solid state electrolyte for an electrochemical device including an anode comprising an electrochemically active metal, wherein the method comprises providing a solid state electrolyte material, and depositing an interfacial layer comprising a first metal on the surface of the solid state electrolyte material, wherein the electrochemically active metal does not form an alloy with the first metal during cycling or formation of the electrochemical device.

25 Claims, 3 Drawing Sheets

(51) Int. Cl.
H01M 10/0525 (2010.01)
C04B 35/01 (2006.01)
H01M 10/0585 (2010.01)

(52) U.S. Cl.
CPC . *H01M 10/0525* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3244* (2013.01); *C04B 2235/3251* (2013.01); *C04B 2235/3256* (2013.01); *C04B 2235/3258* (2013.01); *C04B 2235/3284* (2013.01); *C04B 2235/3286* (2013.01); *C04B 2235/3287* (2013.01); *C04B 2235/3293* (2013.01); *C04B 2235/3294* (2013.01); *C04B 2235/3409* (2013.01); *C04B 2235/3418* (2013.01); *C04B 2235/764* (2013.01); *H01M 10/0585* (2013.01); *H01M 2300/0071* (2013.01); *H01M 2300/0094* (2013.01)

(58) Field of Classification Search
USPC .......................................................... 429/311
See application file for complete search history.

(56) References Cited

U.S. PATENT DOCUMENTS

| 9,093,717 | B2 | 7/2015 | Sakamoto et al. | |
|---|---|---|---|---|
| 2008/0241665 | A1 | 10/2008 | Sano | |
| 2011/0267675 | A1* | 11/2011 | Wang | G02F 1/1523 |
| | | | | 359/275 |
| 2013/0089789 | A1 | 4/2013 | Furuya | |
| 2014/0212735 | A1 | 7/2014 | Li et al. | |
| 2014/0287305 | A1 | 9/2014 | Wachsman et al. | |
| 2015/0044576 | A1 | 2/2015 | Eisele et al. | |
| 2016/0261002 | A1 | 9/2016 | Trevey et al. | |
| 2017/0018781 | A1* | 1/2017 | Zimmerman | H01M 4/0411 |
| 2018/0205112 | A1* | 7/2018 | Thomas-Alyea | H01M 10/056 |
| 2019/0157657 | A1* | 5/2019 | Moitzheim | H01M 4/0471 |

OTHER PUBLICATIONS

Luo, et al., Transition from Superlithiophobicity to Superlithiophilicity of Garnet Solid-State Electrolyte, Journal of the American Chemical Society, 2016, 138:12258-12262.
Murugan, et al., Fast Lithium Ion Conduction in Garnet-Type Li7La3Zr2O12, Angew. Chem. Int. Ed., 2007, 46:7778-7781.
Ohta, et al., LiNbO3-coated LiCoO2 as Cathode Material for All Solid-State Lithium Secondary Batteries, Electrochemistry Communications, 2007, 9:1486-1490.
Rangasamy, et al., The Role of Al and Li Concentration on the Formation of Cubic Garnet Solid Electrolyte of Nominal Composition Li7La3Zr2O12, Solid State Ionics, 2012, 206:28-32.
Sharafi, et al., Characterizing the Li-Li7La3Zr2O12 Interface Stability and Kinetics as a Function of Temperature and Current Density, Journal of Power Sources, 2016, 302:135-139.
Thangadurai, et al., Li6ALa2Ta2O12 (A=Sr, Ba): Novel Garnet-Like Oxides for Fast Lithium Ion Conduction, Advanced Functional Materials, 2005, 15(1):107-112.
Thangadurai, et al., Recent Progress in Solid Oxide and Lithium Ion Conducting Electrolytes Research, Ionics, 2006, 12:81-92.
Tsai, et al., Li7La3Zr2O12 Interface Modification for Li Dendrite Prevention, ACS Applied Materials & Interfaces, 2016, 8:10617-10626.
PCT International Search Report and Written Opinion, PCT/US2018/025697, dated Aug. 10, 2018, 17 pages.

* cited by examiner

SYSTEM AND METHOD FOR THE FORMATION OF FACILE LITHIUM METAL ANODE INTERFACE WITH A SOLID STATE ELECTROLYTE

CROSS-REFERENCES TO RELATED APPLICATIONS

This application claims priority from U.S. Patent Application No. 62/480,051 filed Mar. 31, 2017.

STATEMENT REGARDING FEDERALLY SPONSORED RESEARCH

Not applicable.

FIELD OF THE INVENTION

This invention relates to electrochemical devices, such as lithium battery electrodes, lithium ion conducting solid-state electrolytes, and solid-state lithium ion batteries including these electrodes and solid-state electrolytes.

BACKGROUND

Current state of the art lithium ion batteries comprise two electrodes (an anode and a cathode), a separator material that keeps the electrodes from touching but allows Li+ ions through, and an electrolyte (which is an organic liquid with lithium salts). During charge and discharge, Li+ ions are exchanged between the electrodes.

State-of-the-art Li-ion technology is currently used in low volume production plug-in hybrid and niche high performance vehicles; however, widespread adoption of electrified powertrains requires 25% lower cost, four times higher performance, and safer batteries without the possibility of fire. Thus, future energy storage demands safer, cheaper and higher performance means of energy storage.

One strategy is to develop solid state batteries, where the liquid electrolyte is replaced with a solid material that is conductive to $Li^+$ ions and can offer 3-4 times the energy density while reducing the battery pack cost by about 20%. Despite these attractive features, the fabrication and testing of solid state batteries for bulk scale applications, such as electric vehicles, has not been demonstrated.

Currently, the liquid electrolyte used in SOA Li-ion batteries is not compatible with advanced battery concepts, such as the use of a lithium metal anode or high voltage cathodes. Furthermore, the liquid utilized in SOA Li-ion batteries is flammable and susceptible to combustion upon thermal runaway. The use of a solid electrolyte to replace the liquid used in the SOA enables advanced cell chemistries while simultaneously eliminating the risk of combustion. Several solid-electrolytes have been identified including nitrogen doped lithium phosphate (LiPON) or sulfide based glasses, and companies have been formed to commercialize these types of technologies. While progress has been made towards the performance of cells of these types, large scale manufacturing has not been demonstrated since LiPON must be vapor deposited and sulfide glasses form toxic $H_2S$ upon exposure to ambient air. Thus, special manufacturing techniques are required for those systems.

Super conducting oxides (SCO) have also been proposed for use in a solid-state electrolyte. Although several oxide electrolytes are reported in the literature, selection of a particular material is not trivial since several criteria must be simultaneously satisfied. The following metrics were identified on a combination of the SOA Li-ion battery technology baseline: (1) conductivity>0.2 mS/cm, comparable to SOA Li-ion battery technology, (2) negligible electronic conductivity, (3) electrochemical stability against high voltage cathodes and lithium metal anodes, (4) high temperature stability, (5) reasonable stability in ambient air and moisture, and (6) ability to be manufactured at a thicknesses of <50 microns. Since then, it has been shown that lithium lanthanum zirconium oxide (LLZO) can meet all of the criteria necessary for a solid-electrolyte outlined above.

Power performance and charge time are metrics that are of critical concern for fast-charging automotive, medical hand tools, and consumer electronic applications. Of critical interest for automotive fast-charging is the ability of the solid-electrolyte to support high current densities without failure. The current density at which failure is observed, known as the critical current density (CCD), must be 1-10 $mA/cm^2$ which is not trivial. Higher current densities directly relate to better power performance and faster charging times.

What is needed therefore are methods to raise the critical current density for solid-state batteries in automotive applications.

SUMMARY OF THE INVENTION

The present disclosure provides methods for forming an interfacial layer between a solid-state electrolyte and a lithium metal anode. The interfacial layer comprises an electronically conductive layer that improves the critical current density by lowering the area specific-resistance (ASR) of the interfacial impedance and homogenizes the electronic flux.

In one aspect, the present disclosure provides a method of forming a solid state electrolyte. The method can comprise: (a) providing a solid state electrolyte material including a precursor layer having a first electronic conductivity; and (b) reducing the precursor layer on the solid state electrolyte material to an interfacial layer having a second electronic conductivity greater than the first electronic conductivity. The second electronic conductivity can be greater than $1 \times 10^{-7}$ S/cm, or greater than $1 \times 10^{-6}$ S/cm, or greater than $1 \times 10^{-5}$ S/cm, or greater than $1 \times 10^{-4}$ S/cm, or greater than $1 \times 10^{-3}$ S/cm, or greater than $1 \times 10^{-2}$ S/cm, or greater than $1 \times 10^{-1}$ S/cm.

The precursor layer can comprise one or more metal oxides. The precursor layer can comprise a metal oxide selected from the group consisting of zinc oxide, aluminum doped zinc oxide, gallium doped zinc oxide, indium doped zinc oxide, fluorine doped tin oxide, indium tin oxide, indium-doped cadmium-oxide, graphene, carbon nanotubes, amorphous carbon, vanadium oxide, silicon carbide, titanium nitride, tantalum carbide, lanthanum doped strontium titanate, lanthanum doped barium titanate, and mixtures thereof.

In the method, step (b) can comprise reducing the precursor layer by heating in a reducing environment. In the method, step (b) can comprise reducing the precursor layer by exposing the precursor layer to an oxidizing or inert gas, and then switching to a reducing gas without changing the temperature. In the method, step (b) can comprise reducing the precursor layer using a chemical agent. In the method, step (b) can comprise reducing the precursor layer to the electronically conducting interfacial layer by exposing the precursor layer to an electrochemically active metal. The electrochemically active metal can comprise lithium, magnesium, sodium, or zinc. The electrochemically active metal can comprise lithium.

In the method, the solid state electrolyte material can comprise a ceramic material having a formula of $Li_wA_xM_2Re_{3-y}O_z$ wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75, wherein z is 10.875-13.125, and wherein the material has a garnet-type or garnet-like crystal structure.

In the method, the precursor layer can comprise a second solid electrolyte material having any combination oxide or phosphate materials with a garnet, perovskite, NaSICON, or LiSICON phase. The garnet phase can be based on tin. The NASICON can be based on titanium.

In another aspect, the present disclosure provides a method of forming a solid state electrolyte for an electrochemical device including an anode comprising an electrochemically active metal. The method can comprise: (a) providing a solid state electrolyte material; and (b) depositing an interfacial layer on the surface of the solid state electrolyte material, wherein the interfacial layer comprises a first metal, and wherein the electrochemically active metal does not form an alloy with the first metal during cycling or formation of the electrochemical device.

In the method, the electrochemically active metal can comprise lithium, magnesium, sodium, or zinc. In the method, the electrochemically active metal can comprise lithium. In the method, the anode can consist essentially of lithium.

In the method, the first metal can comprise a blocking metal with respect to the electrochemically active metal, a semi-blocking metal with respect to the electrochemically active metal, a non-blocking metal with respect to the electrochemically active metal, or mixtures thereof. In the method, the blocking metal can comprise nickel, molybdenum, titanium, or mixtures thereof. In the method, the semi-blocking metal can comprise silver, gold, platinum, copper, chromium, iron, cobalt, steel, stainless steel, or mixtures thereof. In the method, the non-blocking metal can comprise aluminum, lead, zinc, indium, gallium, magnesium, silicon, bismuth, and combinations thereof.

In the method, the solid state electrolyte material can have a first electronic conductivity; and the interfacial layer can have a second electronic conductivity greater than the first electronic conductivity. The second electronic conductivity can be greater than $1\times10^{-7}$ S/cm, or greater than $1\times10^{-6}$ S/cm, or greater than $1\times10^{-5}$ S/cm, or greater than $1\times10^{-4}$ S/cm, or greater than $1\times10^{-3}$ S/cm, or greater than $1\times10^{-2}$ S/cm, or greater than $1\times10^{-1}$ S/cm.

In the method, the solid state electrolyte material can comprise a ceramic material having a formula of $Li_wA_xM_2Re_{3-y}O_z$ wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75, wherein z is 10.875-13.125, and wherein the material has a garnet-type or garnet-like crystal structure.

In the method, the solid electrolyte material can have the formula $Li_{6.25}La_{2.7}Zr_2Al_{0.25}O_{12}$.

In another aspect, the present disclosure provides a method of forming a solid state electrolyte. The method can comprise: (a) providing a solid state electrolyte material having a first electronic conductivity; and (b) coating the solid state electrolyte material with a polymeric layer having a second electronic conductivity greater than the first electronic conductivity. The second electronic conductivity can be greater than $1\times10^{-7}$ S/cm, or greater than $1\times10^{-6}$ S/cm, or greater than $1\times10^{-5}$ S/cm, or greater than $1\times10^{-4}$ S/cm, or greater than $1\times10^{-3}$ S/cm, or greater than $1\times10^{-2}$ S/cm, or greater than $1\times10^{-1}$ S/cm.

In the method, the polymeric layer can comprise one or more polymeric materials. The polymeric layer can comprise a polymer selected from the group consisting of polyacetylene, polypyrrole, polyaniline, poly(p-phenylene vinylene) (PPV), poly(3-alkylthiophenes), poly(3,4-ethylenedioxythiophene) (PEDOT), poly(p-phenylene sulfide), and mixtures thereof.

In the method, the solid state electrolyte material can comprise a ceramic material having a formula of $Li_wA_xM_2Re_{3-y}O_z$ wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75, wherein z is 10.875-13.125, and wherein the material has a garnet-type or garnet-like crystal structure.

In the method, the solid electrolyte material can have the formula $Li_{6.25}La_{2.7}Zr_2Al_{0.25}O_{12}$.

In another aspect, the present disclosure provides an electrochemical device comprising: a cathode; a solid state electrolyte comprising a solid state electrolyte material and an interfacial layer on the surface of the solid state electrolyte material, wherein the interfacial layer comprises a first metal; and an anode comprising an electrochemically active metal, wherein the electrochemically active metal does not form an alloy with the first metal during cycling or formation of the electrochemical device. The electrochemically active metal can comprise lithium, magnesium, sodium, or zinc. The electrochemically active metal can comprise lithium. The anode can consist essentially of lithium metal. The first metal can comprise a blocking metal with respect to the electrochemically active metal, a semi-blocking metal with respect to the electrochemically active metal, a non-blocking metal with respect to the electrochemically active metal, or mixtures thereof. The blocking metal can comprise nickel, molybdenum, titanium, or mixtures thereof. The semi-blocking metal can comprise silver, gold, platinum, copper, chromium, iron, cobalt, steel, stainless steel, or mixtures thereof. The non-blocking metal can comprise aluminum, lead, zinc, indium, gallium, magnesium, silicon, bismuth, and combinations thereof.

In the electrochemical device, the solid state electrolyte material can have a first electronic conductivity; and the interfacial layer can have a second electronic conductivity greater than the first electronic conductivity. The second electronic conductivity can be greater than $1 \times 10^{-7}$ S/cm, or greater than $1 \times 10^{-6}$ S/cm, or greater than $1 \times 10^{-5}$ S/cm, or greater than $1 \times 10^{-4}$ S/cm, or greater than $1 \times 10^{-3}$ S/cm, or greater than $1 \times 10^{-2}$ S/cm, or greater than $1 \times 10^{-1}$ S/cm.

In the electrochemical device, the solid state electrolyte material can comprise a ceramic material having a formula of $Li_wA_xM_2Re_{3-y}O_z$ wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75, wherein z is 10.875-13.125, and wherein the material has a garnet-type or garnet-like crystal structure.

In the electrochemical device, the solid electrolyte material can have the formula $Li_{6.25}La_{2.7}Zr_2Al_{0.25}O_{12}$.

In another aspect, the present disclosure provides an electrochemical device comprising: a cathode; a solid state electrolyte comprising a solid state electrolyte material having a first electronic conductivity and a polymeric coating layer having a second electronic conductivity greater than the first electronic conductivity; and an anode comprising an electrochemically active metal. The electrochemically active metal can comprise lithium, magnesium, sodium, or zinc. The electrochemically active metal can comprise lithium. The anode can consist essentially of lithium metal.

In the electrochemical device, the polymeric coating layer can comprise a polymer selected from the group consisting of polyacetylene, polypyrrole, polyaniline, poly(p-phenylene vinylene) (PPV), poly(3-alkylthiophenes), poly(3,4-ethylenedioxythiophene) (PEDOT), poly(p-phenylene sulfide), and mixtures thereof.

In the electrochemical device, the solid state electrolyte material can comprise a ceramic material having a formula of $Li_wA_xM_2Re_{3-y}O_z$ wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75, wherein z is 10.875-13.125, and wherein the material has a garnet-type or garnet-like crystal structure.

In the electrochemical device, the solid electrolyte material can have the formula $Li_{6.25}La_{2.7}Zr_2Al_{0.25}O_{12}$.

The foregoing and other aspects and advantages of the invention will appear from the following description. In the description, reference is made to the accompanying drawings which form a part hereof, and in which there is shown by way of illustration an example embodiment of the invention. Such embodiment does not necessarily represent the full scope of the invention, however, and reference is made therefore to the claims and herein for interpreting the scope of the invention.

Figure 1:
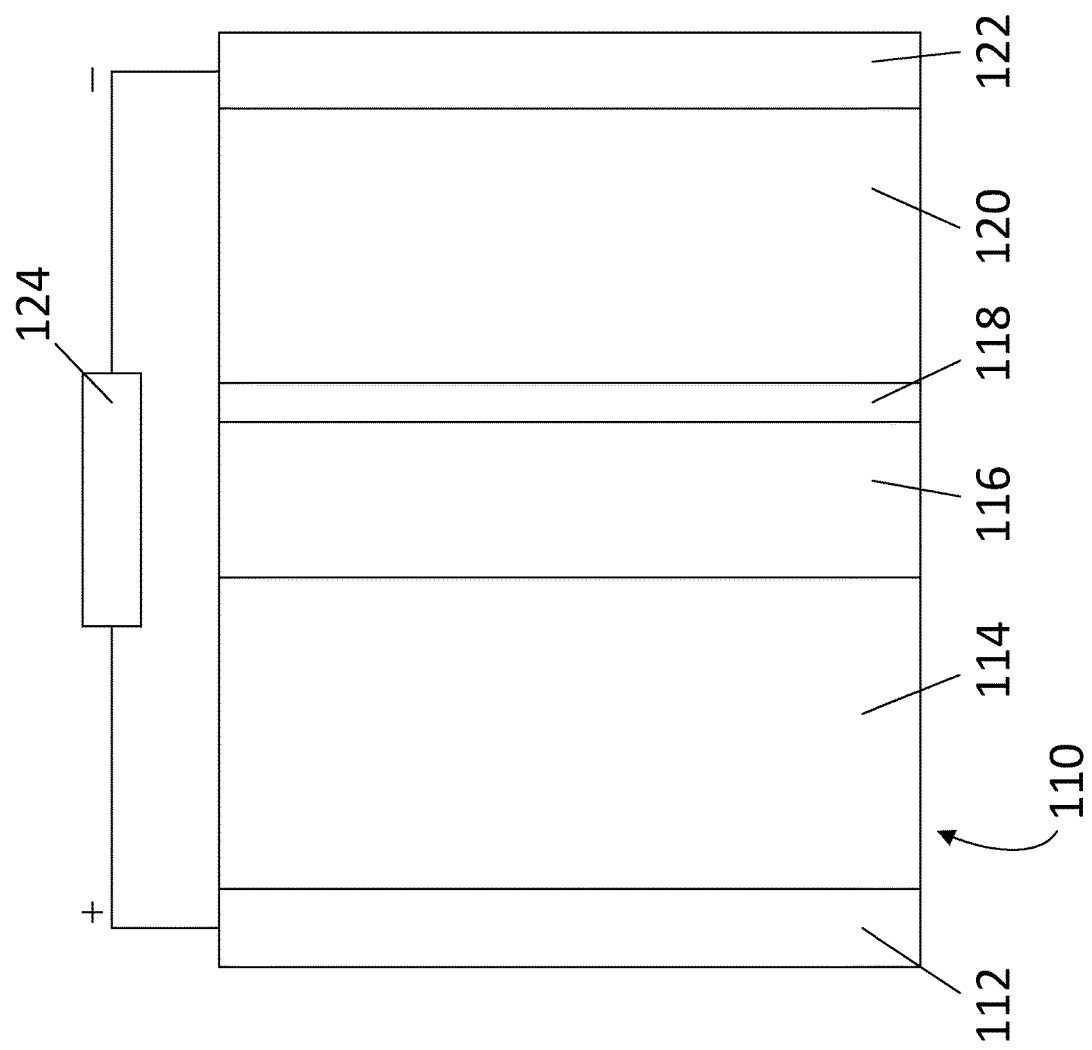
FIG. 1 is a schematic of a lithium metal battery.

The invention will be better understood and features, aspects and advantages other than those set forth above will become apparent when consideration is given to the following detailed description thereof. Such detailed description makes reference to the drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. Skilled artisans will recognize the examples provided herein have many useful alternatives and fall within the scope of embodiments of the invention.

The various embodiments described herein provide methods for forming an interfacial layer between a solid-state electrolyte and a lithium metal anode. The interfacial layer comprises an electronically conducting layer positioned between the solid-state electrolyte and the lithium metal anode to improve the critical current density by lowering the area-specific resistance at the interface and homogenizing electronic flux.

The term "solid-electrolyte" as used herein can refer to a phase which acts to increase the ionic conductivity of the composite electrode.

The term "critical current density (CCD)" as used herein can refer to the current density a solid electrolyte can support before failure is observed.

The term "area-specific resistance (ASR)" as used herein can refer to the area specific resistance of any component, but is generally used to define the resistance between the lithium metal anode and solid electrolyte interface.

The term "blocking" as used herein can refer to a material with sufficiently low lithium solubility as determined by the thermodynamic phase diagrams such that the material can be considered non-reactive with lithium.

The term "semi-blocking" as used herein can refer to a material with moderately low lithium solubility as determined by the thermodynamic phase diagrams such that the material can be considered non-reactive with lithium.

The term "non-blocking" as used herein can refer to a material with significant lithium solubility as determined by the thermodynamic phase diagrams such that the material can be considered to undergo alloying reactions with Li.

The term "conversion phase" as used herein can refer to a material which can be converted by a chemical or electrochemical reaction reduction reaction to form a blocking, semi-blocking, or non-blocking metallically conductive coating.

FIG. 1 shows a non-limiting example application of a lithium metal battery 110 according to one embodiment of the present disclosure. The lithium metal battery 110 of FIG. 1 includes a first current collector 112 (i.e., aluminum) in contact with a cathode 114. A solid-state electrolyte 116 is arranged between the cathode 114 and an interfacial layer 118. The interfacial layer 118 is arranged between the solid-state electrolyte 116 and an anode 120, which is in contact with a second current collector 122 (i.e., copper). The first current collector 112 and the second current collector 122 of the lithium metal battery 110 may be in electrical communication with an electrical component 124. The electrical component 124 could place the lithium metal battery 110 in electrical communication with an electrical load that discharges the battery or a charger that charges the battery.

The first current collector 112 and the second current collector 122 can comprise a conductive metal or any suitable conductive material. In some embodiments, the first current collector 112 and the second current collector 122 comprise aluminum, nickel, copper, combinations and alloys thereof. In some embodiments, the first current collector 112 and the second current collector 122 have a thickness of 0.1 microns or greater. It is to be appreciated that the thicknesses depicted in FIG. 1 are not drawn to scale. Further, it is to be appreciated that the thickness of the first current collector 112 and the second current collector 122 may be different.

In some embodiments, a suitable cathode 114 of the lithium metal battery 110 is a lithium host material capable of storing and subsequently releasing lithium ions. An example cathode active material is a lithium metal oxide wherein the metal is one or more aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on delithiation and cycling performance of the cathode materials. The cathode active material can be a mixture of any number of these cathode active materials. In other embodiments, a suitable material for the cathode 114 of the lithium metal battery 110 is porous carbon (for a lithium air battery), or a sulfur containing material (for a lithium sulfur battery).

In some embodiments, a suitable anode 118 of the lithium metal battery 110 consists of lithium metal. Another example anode 118 material consists essentially of lithium metal. In other embodiments, a suitable anode 118 consists essentially of magnesium, sodium, or zinc metal.

An example solid-state electrolyte 116 material for the lithium metal battery 110 can include an electrolyte material having the formula $Li_uRe_vM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn; u can vary from 3-7.5;

v can vary from 0-3;

w can vary from 0-2; and y can vary from 11-12.5.

$Li_7La_3Zr_2O_{12}$ (LLZO) materials are beneficial for use as the solid-state electrolyte 116 material for the lithium metal battery 110. LLZO materials have been reported as having an electronic conductivity of $2\times10^{-8}$ S/cm. See, Ezhiyl Rangasamy, Jeff Wolfenstine, Jeffrey Sakamoto, "The role of Al and Li concentration on the formation of cubic garnet solid electrolyte of nominal composition $Li_7La_3Zr_2O_{12}$", *Solid State Ionics* 206 (2012) 28.

Another example solid-state electrolyte 116 can include any combination oxide or phosphate materials with a garnet, perovskite, NaSICON, or LiSICON phase. The solid-state electrolyte 116 of the lithium metal battery 110 can include any solid-like material capable of storing and transporting ions between the anode and cathode, so long as the solid-like material has negligible electronic conductivity and is electrochemically stable against high voltage cathodes and lithium metal anodes.

Figure 2:
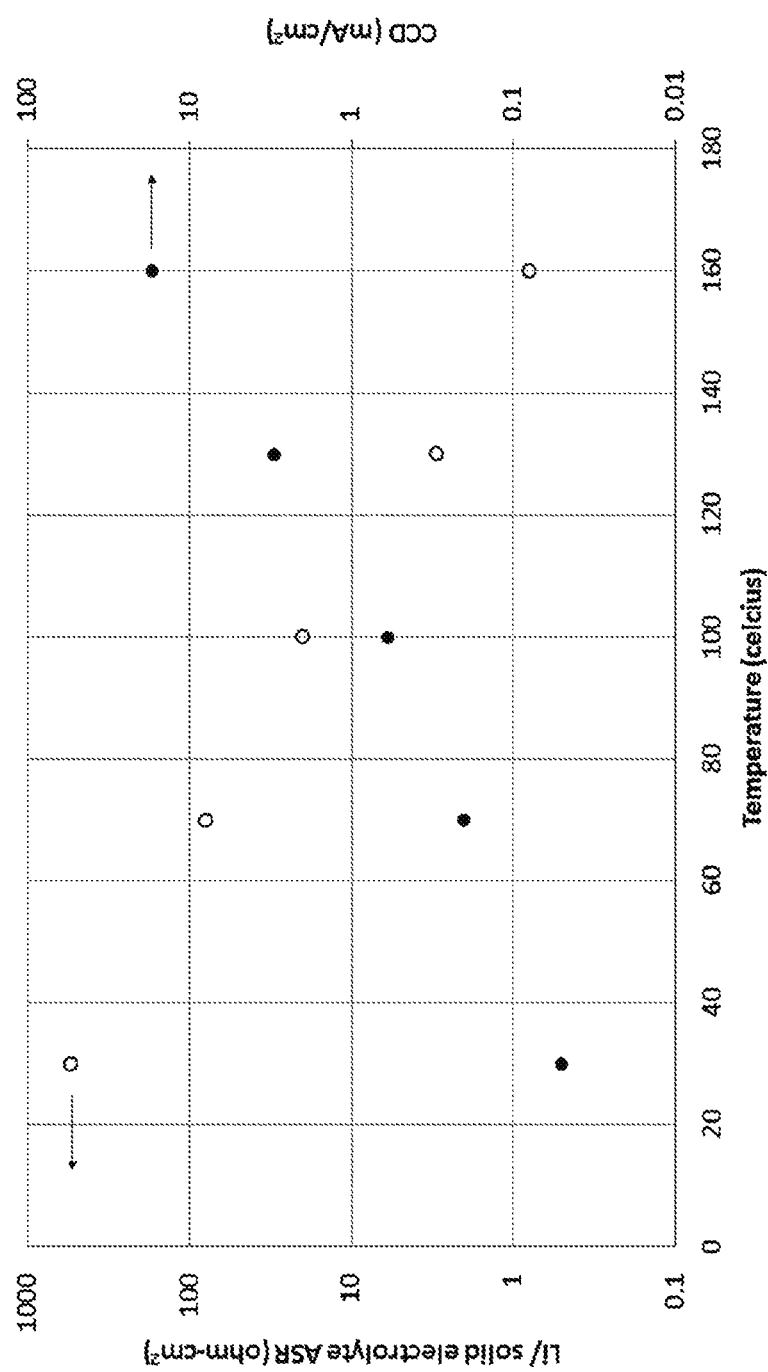
FIG. 2 shows the variation of a Li/solid electrolyte area-specific resistance (ASR) and variation of the critical current density (CCD) as a function of temperature.
Figure 3:
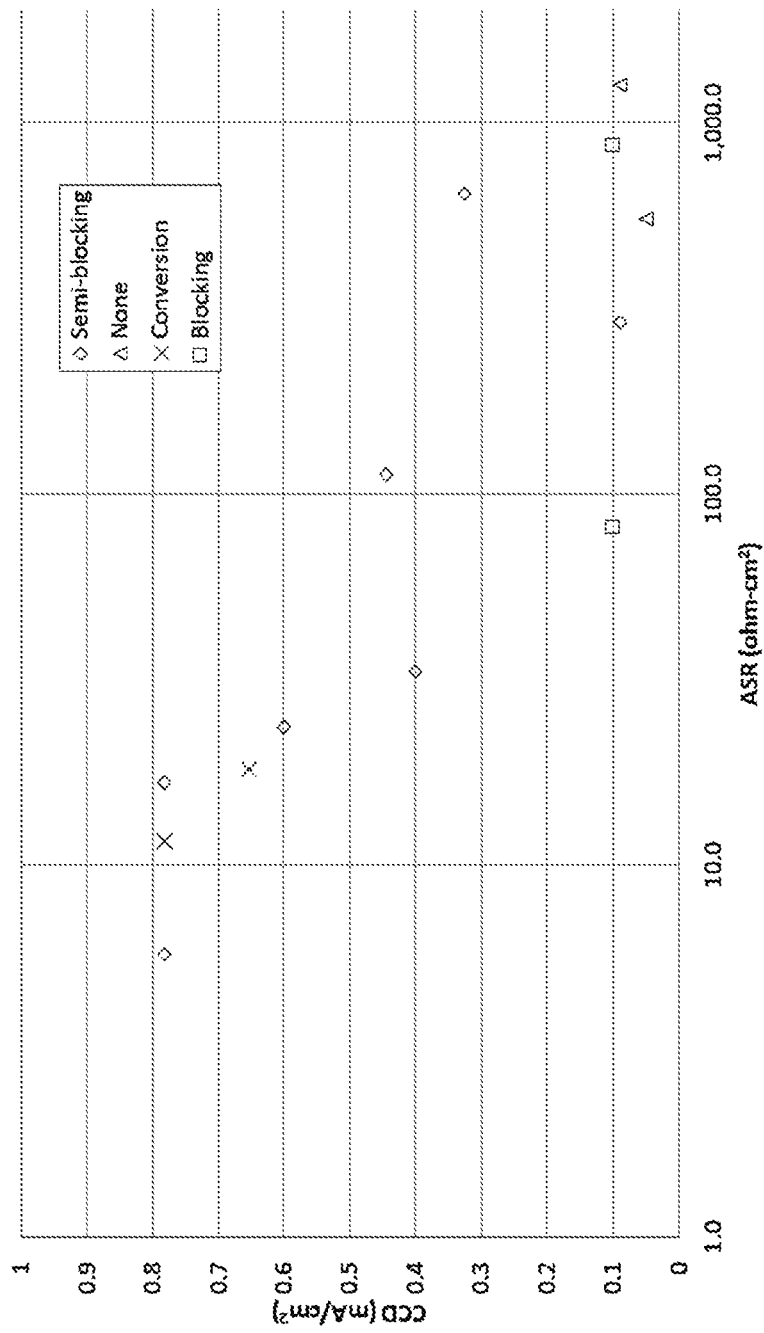
FIG. 3 shows the critical current density (CCD) vs. lithium interfacial impedance (ASR) for three different classes of coating. The baseline points ("None" series) are taken from a sample measured at 30° C. shown in FIG. 2 and from internal experiments for comparison.

One embodiment described herein relates to a method for reducing the area-specific resistance (ASR) at the interface between the solid-state electrolyte 116 and the anode 120. FIG. 2 shows how the variation of ASR affects the critical current density (CCD) of a lithium metal battery 110 as a function of temperature. This suggests that one of the factors contributing to a higher CCD, which directly relates to better power performance and faster charging times, is the ASR at the interface between the anode 120 and the solid-state electrolyte 116. FIG. 3 shows the CCD of a lithium metal battery 110 versus the ASR, which includes various interfacial layers 118 according to various aspects of the present disclosure. This suggests that the composition of the interfacial layer 118 can affect the CCD of the lithium metal battery 110.

In some embodiments, the interfacial layer 118 includes an electronically conductive layer that forms a facile interface between the anode 120 and the solid-state electrolyte 116. The interfacial layer 118 homogenizes the applied current density between the anode 120 and the solid-state electrolyte 116 to lower the ASR and increase the CCD of the lithium metal battery 110. An example interfacial layer 118 can comprise an electronically conductive layer that extends from an electrified surface on the anode 120 to the face of the solid-state electrolyte 116. The interfacial layer 118 converges the apparent and actual current density by filling the grain boundaries between the anode 120 and the solid-state electrolyte 116, and by extending along the whole face of the solid-state electrolyte 116. Lowering the ASR at the interface as disclosed in the present disclosure does not necessitate alloying of the anode 120 with the interfacial layer 118. In the case of a lithium anode, the present disclosure does not necessitate the dissolution of lithium into the interfacial layer 118. As such, several classes of electronically conducting materials can be used as interfacial layers 118 to improve the performance of the lithium ion battery 110.

In some embodiments, the interfacial layer 118 comprises any phase which is electronically conductive. These phases can include metals, ceramics, or polymeric material. In other non-limiting examples, the interfacial layer 118 may comprise non-blocking metals, semi-blocking metals, blocking metals, and mixtures thereof. In some aspects, the interfacial layer 118 has a second electronic conductivity that is greater than a first electronic conductivity of the solid-state electrolyte 116.

In some aspects, the interfacial layer 118 has an electronic conductivity that is greater than $1\times10^{-7}$ S/cm, or greater than $1\times10^{-6}$ S/cm, or greater than $1\times10^{-5}$ S/cm, or greater than $1\times10^{-4}$ S/cm, or greater than $1\times10^{-3}$ S/cm, or greater than $1\times10^{-2}$ S/cm, or greater than $1\times10^{-1}$ S/cm.

In some non-limiting examples of the present disclosure, the interfacial layer 118 includes non-blocking metals such as aluminum, lead, zinc, indium, gallium, magnesium, silicon, bismuth, and combinations thereof. Another example of the interfacial layer 118 includes semi-blocking metals such as gold, silver, platinum, copper, chromium, iron, cobalt, steel, stainless steel, and combinations thereof. In other examples the interfacial layer 118 includes blocking metals such as nickel, molybdenum, and titanium. Even though blocking metals contain low lithium solubility based on the thermodynamic phase diagram, a facile interface is formed and charge transfer is observed. Additionally, any alloy or combination of blocking, semi-blocking, and/or non-blocking metals may be used.

One method for forming the solid-state electrolyte 116 for an electrochemical device includes first providing a solid-state electrolyte 116 material and depositing an interfacial layer 118 on the solid-state electrolyte 116 material. In some aspects, the interfacial layer 118 comprises a first metal, and the electrochemical device includes the anode 120 comprising an electrochemically active material. In some embodiments, the first metal and the electrochemically active metal do not form an alloy during cycling or formation of the electrochemical device. The first metal can include blocking, semi-blocking, non-blocking metals, mixtures thereof. The electrochemically active material can include lithium, magnesium, sodium, or zinc.

The interfacial layer 118 can be deposited on the solid-state electrolyte 116 using several different deposition techniques. Gas phase deposition methods of the interfacial layer 118 can include physical vapor deposition and sputtering deposition such as radio frequency sputtering, multi-frequency sputtering, electron beam evaporation, direct current sputtering, reactive sputtering, non-reactive sputtering, chemical vapor deposition, plasma-enhanced chemical vapor deposition, metal-organic chemical vapor deposition, atomic layer deposition, molecular layer deposition, laser-assisted deposition, and so forth.

The deposition method can also be non-vacuum based such as plasma spray, spray pyrolysis, slot die coating, screen printing, and so forth. Alternatively, sol-gel wet chemistry can be used to deposit the interfacial layer 118. It is to be appreciated that any coating or deposition method may be used as would be recognized by one skilled in the art.

In some embodiments, the interfacial layer 118 includes any electronically conducting polymeric material such as polyacetylene, polypyrrole, polyaniline, poly(p-phenylene vinylene) (PPV), poly(3-alkylthiophenes), poly(3,4-ethylenedioxythiophene) (PEDOT), poly(p-phenylene sulfide), their copolymers, and mixtures thereof.

In one embodiment, the solid-state electrolyte 116 is formed by first providing the solid-state electrolyte 116 material having a first electronic conductivity, and then depositing the interfacial layer 118 with a second electronic conductivity to the surface of the solid-state electrolyte 116 material. In one embodiment, the interfacial layer 118 comprises any of the polymeric materials listed above and is deposited in any manner listed above. In some aspects, the second electronic conductivity is greater than the first electronic conductivity. In one embodiment, the second electronic conductivity of the interfacial layer 118 is similar to the values listed above.

In some non-limiting examples of the present disclosure, the interfacial layer 118 includes any electronically conducting ceramic. The electronically conducting ceramic can include one or more metal oxide such as zinc oxide, aluminum doped zinc oxide, gallium doped zinc oxide, indium doped zinc oxide, fluorine doped tin oxide, indium tin oxide, indium-doped cadmium-oxide, graphene, carbon nanotubes, amorphous carbon, vanadium oxide, silicon carbide, titanium nitride, tantalum carbide, lanthanum doped strontium titanate, and lanthanum doped barium titanate.

In some non-limiting examples of the present disclosure, the interfacial layer 118 is formed on a solid-state electrolyte 116 material from a conversion phase material. In one embodiment, the solid-state electrolyte 116 material is first provided and includes a precursor layer having a first electronic conductivity. The precursor layer is then reduced on the solid-state electrolyte material to an interfacial layer 118 having a second electronic conductivity greater than the first electronic conductivity.

In some embodiments, the second electronic conductivity of the interfacial layer 118 is similar to the values listed above. A suitable conversion phase material can include any of the ceramics listed above. In one non-limiting example, the conversion phase material could include tin oxide as the precursor layer, which becomes chemically or electrochemically reduced to tin as the interfacial layer 118. Alternatively, the conversion phase can include a second solid-state electrolyte. A suitable second solid-state electrolyte can comprise one or more solid-electrolyte listed above. Additionally, a suitable second solid-state electrolyte can include a garnet phase or a NaSICON phase. In such a case, the garnet phase is based on tin and the NaSCION is based on titanium.

Multiple methods can be used to reduce the conversion phase material. In one embodiment, the precursor layer can be reduced using a chemical agent. Alternatively, conversion phase material can be chemically reduced upon exposure to the anode 120 such as lithium metal. In other embodiments, the interfacial layer 118 can be formed by reducing the surface of an otherwise stable solid-state electrolyte. In some examples, this can be accomplished by heating in any reducing environment. Alternatively, the gas environment during sintering can be switched from a first oxidizing or inert environment to a second reducing environment. In some embodiments, this occurs without changing the temperature.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

Various features and advantages of the invention are set forth in the following claims.

We claim:

1. A method of forming a solid state electrolyte, the method comprising:
    (a) providing a solid state electrolyte material including a precursor layer having a first electronic conductivity; and
    (b) reducing the precursor layer on the solid state electrolyte material to an interfacial layer having a second electronic conductivity greater than the first electronic conductivity.

2. The method of claim 1, wherein the precursor layer comprises a metal oxide selected from the group consisting of zinc oxide, aluminum doped zinc oxide, gallium doped zinc oxide, indium doped zinc oxide, fluorine doped tin oxide, indium tin oxide, indium-doped cadmium-oxide, graphene, carbon nanotubes, amorphous carbon, vanadium oxide, silicon carbide, titanium nitride, tantalum carbide, lanthanum doped strontium titanate, lanthanum doped barium titanate, and mixtures thereof.

3. The method of claim 1, wherein step (b) comprises reducing the precursor layer by heating in a reducing environment.

4. The method of claim 1, wherein step (b) comprises reducing the precursor layer by exposing the precursor layer to an oxidizing or inert gas, and then switching to a reducing gas without changing the temperature.

5. The method of claim 1, wherein step (b) comprises reducing the precursor layer using a chemical agent.

6. The method of claim 1, wherein step (b) comprises reducing the precursor layer to the electronically conducting interfacial layer by exposing the precursor layer to an electrochemically active metal.

7. The method of claim 6, wherein the electrochemically active metal comprises lithium, magnesium, sodium, or zinc.

8. The method of claim 1, wherein the solid state electrolyte material comprises a ceramic material having a formula of $Li_wA_xM_2Re_{3-y}O_z$
    wherein w is 5-7.5,
    wherein A is selected from B, Al, Ga, In, Zn, Cd, Y, Sc, Mg, Ca, Sr, Ba, and any combination thereof,
    wherein x is 0-2,
    wherein M is selected from Zr, Hf, Nb, Ta, Mo, W, Sn, Ge, Si, Sb, Se, Te, and any combination thereof,
    wherein Re is selected from lanthanide elements, actinide elements, and any combination thereof,
    wherein y is 0.01-0.75,
    wherein z is 10.875-13.125, and
    wherein the material has a garnet-type or garnet-like crystal structure.

9. A method of forming a solid state electrolyte for an electrochemical device including an anode comprising an electrochemically active metal, the method comprising:
    (a) providing a solid state electrolyte material;
    (b) depositing an electronically conductive interfacial layer on the surface of the solid state electrolyte material, the interfacial layer comprising a first metal, wherein the electrochemically active metal does not form an alloy with the first metal during cycling or formation of the electrochemical device.

10. The method of claim 9, wherein the electrochemically active metal comprises lithium, magnesium, sodium, or zinc.

11. The method of claim 9 wherein:
    the first metal comprises a blocking metal with respect to the electrochemically active metal, wherein the blocking metal comprises nickel, molybdenum, titanium, or mixtures thereof, a semi-blocking metal with respect to the electrochemically active metal, wherein the semi-blocking metal comprises silver, gold, platinum, copper, chromium, iron, cobalt, steel, stainless steel, or mixtures thereof, a non-blocking metal with respect to the electrochemically active metal, wherein the non-blocking metal comprises aluminum, lead, zinc, indium, gallium, magnesium, silicon, bismuth and combinations thereof, or mixtures thereof.

12. The method of claim 9, wherein:
    the solid state electrolyte material has a first electronic conductivity; and
    the interfacial layer has a second electronic conductivity greater than the first electronic conductivity.

13. The method of claim 9, wherein the solid state electrolyte material comprises a ceramic material having a formula of $Li_wA_xM_2Re_{3-y}O_z$
    wherein w is 5-7.5,
    wherein A is selected from B, Al, Ga, In, Zn, Cd, Y, Sc, Mg, Ca, Sr, Ba, and any combination thereof,
    wherein x is 0-2,
    wherein M is selected from Zr, Hf, Nb, Ta, Mo, W, Sn, Ge, Si, Sb, Se, Te, and any combination thereof,
    wherein Re is selected from lanthanide elements, actinide elements, and any combination thereof,
    wherein y is 0.01-0.75,
    wherein z is 10.875-13.125, and
    wherein the material has a garnet-type or garnet-like crystal structure.

14. A method of forming a solid state electrolyte, the method comprising:
    (a) providing a solid state electrolyte material having a first electronic conductivity; and
    (b) coating the solid state electrolyte material with an electronically conducting polymeric layer having a second electronic conductivity greater than the first electronic conductivity,
    wherein the polymeric layer improves a critical current density by homogenizing electronic flux when the polymeric layer contacts an anode.

15. The method of claim 14, wherein the polymeric layer comprises a polymer selected from the group consisting of polyacetylene, polypyrrole, polyaniline, poly(p-phenylene vinylene) (PPV), poly(3-alkylthiophenes), poly(3,4-ethylenedioxythiophene) (PEDOT), poly(p-phenylene sulfide), and mixtures thereof.

16. The method of claim 14, wherein the solid state electrolyte material comprises a ceramic material having a formula of $Li_wA_xM_2Re_{3-y}O_z$
    wherein w is 5-7.5,
    wherein A is selected from B, Al, Ga, In, Zn, Cd, Y, Sc, Mg, Ca, Sr, Ba, and any combination thereof,
    wherein x is 0-2,
    wherein M is selected from Zr, Hf, Nb, Ta, Mo, W, Sn, Ge, Si, Sb, Se, Te, and any combination thereof,
    wherein Re is selected from lanthanide elements, actinide elements, and any combination thereof, wherein y is 0.01-0.75, wherein z is 10.875-13.125, and wherein the material has a garnet-type or garnet-like crystal structure.

17. An electrochemical device comprising:

a cathode;

a solid state electrolyte having a first surface and an opposite second surface, the solid state electrolyte comprising a solid state electrolyte material; and an electronically conductive interfacial layer on the first surface of the solid state electrolyte, the interfacial layer comprising a first metal; and an anode comprising an electrochemically active metal, wherein the electrochemically active metal does not form an alloy with the first metal during cycling or formation of the electrochemical device, wherein the second surface of the solid state electrolyte contacts the cathode, and wherein the interfacial layer contacts the anode thereby improving a critical current density by homogenizing electronic flux.

18. The device of claim 17, wherein the electrochemically active metal comprises lithium, magnesium, sodium, or zinc.

19. The device of claim 17 wherein:

the first metal comprises a blocking metal with respect to the electrochemically active metal, wherein the blocking metal comprises nickel, molybdenum, titanium, or mixtures thereof, a semi-blocking metal with respect to the electrochemically active metal, wherein the semi-blocking metal comprises silver, gold, platinum, copper, chromium, iron, cobalt, steel, stainless steel, or mixtures thereof, a non-blocking metal with respect to the electrochemically active metal, wherein the non-blocking metal comprises aluminum, lead, zinc, indium, gallium, magnesium, silicon, bismuth, and combinations thereof, or mixtures thereof.

20. The device of claim 17, wherein:

the solid state electrolyte material has a first electronic conductivity; and the interfacial layer has a second electronic conductivity greater than the first electronic conductivity.

21. The device of claim 17, wherein the solid state electrolyte material comprises a ceramic material having a formula of $Li_wA_xM_2Re_{3-y}O_z$ wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75, wherein z is 10.875-13.125, and wherein the material has a garnet-type or garnet-like crystal structure.

22. An electrochemical device comprising:

a cathode;

a solid state electrolyte comprising a solid state electrolyte material having a first electronic conductivity and an electronically conducting polymeric coating layer having a second electronic conductivity greater than the first electronic conductivity; and an anode comprising an electrochemically active metal, wherein the polymeric coating layer contacts the anode thereby improving a critical current density by homogenizing electronic flux.

23. The device of claim 22, wherein the electrochemically active metal comprises lithium, magnesium, sodium, or zinc.

24. The device of claim 22, wherein the polymeric coating layer comprises a polymer selected from the group consisting of polyacetylene, polypyrrole, polyaniline, poly(p-phenylene vinylene) (PPV), poly(3-alkylthiophenes), poly(3,4-ethylenedioxythiophene) (PEDOT), poly(p-phenylene sulfide), and mixtures thereof.

25. The device of claim 22, wherein the solid state electrolyte material comprises a ceramic material having a formula of $Li_wA_xM_2Re_{3-y}O_z$ wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75, wherein z is 10.875-13.125, and wherein the material has a garnet-type or garnet-like crystal structure.

* * * * *